US008874068B2

(12) United States Patent
Mitchell, Jr. et al.

(10) Patent No.: US 8,874,068 B2
(45) Date of Patent: Oct. 28, 2014

(54) EMERGENCY 911 DATA MESSAGING

(75) Inventors: Donald L. Mitchell, Jr., Bellevue, WA (US); Yinjun Zhu, Sammamish, WA (US); Myron D'Souza, Seattle, WA (US); Roger S. Marshall, Auburn, WA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 0 days.

(21) Appl. No.: 13/431,016

(22) Filed: Mar. 27, 2012

(65) Prior Publication Data

US 2012/0184239 A1 Jul. 19, 2012

Related U.S. Application Data

(62) Division of application No. 12/232,417, filed on Sep. 17, 2008, now Pat. No. 8,185,087.

(60) Provisional application No. 60/960,119, filed on Sep. 17, 2007.

(51) Int. Cl.
H04M 11/04 (2006.01)
H04W 4/22 (2009.01)
H04W 76/00 (2009.01)
H04W 4/14 (2009.01)
H04W 88/18 (2009.01)

(52) U.S. Cl.
CPC .............. *H04W 4/22* (2013.01); *H04W 76/007* (2013.01); *H04W 4/14* (2013.01); *H04W 88/184* (2013.01)
USPC ..................................... 455/404.1; 455/404.2

(58) Field of Classification Search
USPC .......................... 455/404.1, 550.1, 466, 414.4
See application file for complete search history.

(56) References Cited

U.S. PATENT DOCUMENTS

| | | | |
|---|---|---|---|
| 1,103,073 A | 7/1914 | O'Connell |
| 4,494,119 A | 1/1985 | Wimbush |
| 4,651,156 A | 3/1987 | Martinez |
| 4,706,275 A | 11/1987 | Kamil |
| 4,891,638 A | 1/1990 | Davis |
| 4,891,650 A | 1/1990 | Sheffer |
| 4,952,928 A | 8/1990 | Carroll |
| 4,972,484 A | 11/1990 | Theile et al. |

(Continued)

FOREIGN PATENT DOCUMENTS

| | | |
|---|---|---|
| DE | WO/2004021726 | 3/2004 |
| WO | WO/0211407 | 2/2002 |

OTHER PUBLICATIONS

International Preliminary Report on Patentability in PCT/US2008/10828 dated May 6, 2010.

(Continued)

*Primary Examiner* — Kiet Doan
*Assistant Examiner* — Dung Lam
(74) *Attorney, Agent, or Firm* — William H. Bollman

(57) ABSTRACT

A data request is generated (e.g., text, email, SMS, multimedia messaging system (MMS), etc.) from a source device. The data request is delivered to a PSAP or other emergency monitoring service location in a useable format. Exemplary useable formats include a canned voice message, delivery to a call center that translates data to voice, text to speech, and text to instant messaging (IM). Additional information and location are staged for use by the PSAP or other monitoring service location.

21 Claims, 3 Drawing Sheets

(56) References Cited

U.S. PATENT DOCUMENTS

| | | |
|---|---|---|
| 5,014,206 A | 5/1991 | Scribner |
| 5,043,736 A | 8/1991 | Darnell |
| 5,055,851 A | 10/1991 | Sheffer |
| 5,068,656 A | 11/1991 | Sutherland |
| 5,068,891 A | 11/1991 | Marshall |
| 5,119,104 A | 6/1992 | Heller |
| 5,144,283 A | 9/1992 | Arens |
| 5,161,180 A | 11/1992 | Chavous |
| 5,177,478 A | 1/1993 | Wagai |
| 5,193,215 A | 3/1993 | Olmer |
| 5,208,756 A | 5/1993 | Song |
| 5,214,789 A | 5/1993 | George |
| 5,218,367 A | 6/1993 | Sheffer |
| 5,223,844 A | 6/1993 | Mansell |
| 5,239,570 A | 8/1993 | Koster |
| 5,265,630 A | 11/1993 | Hartmann |
| 5,266,944 A | 11/1993 | Caroll |
| 5,283,570 A | 2/1994 | DeLucca |
| 5,289,527 A | 2/1994 | Tiedemann, Jr. |
| 5,293,642 A | 3/1994 | Lo |
| 5,299,132 A | 3/1994 | Wortham |
| 5,311,516 A | 5/1994 | Kuznicki |
| 5,325,302 A | 6/1994 | Izidon |
| 5,327,529 A | 7/1994 | Fults et al. |
| 5,334,974 A | 8/1994 | Simms |
| 5,343,493 A | 8/1994 | Karimulah |
| 5,347,568 A | 9/1994 | Moody |
| 5,351,235 A | 9/1994 | Lahtinen |
| 5,361,212 A | 11/1994 | Class |
| 5,363,425 A | 11/1994 | Mufti |
| 5,374,936 A | 12/1994 | Feng |
| 5,379,451 A | 1/1995 | Nakagoshi |
| 5,381,338 A | 1/1995 | Wysocki |
| 5,387,993 A | 2/1995 | Heller |
| 5,388,147 A | 2/1995 | Grimes |
| 5,390,339 A | 2/1995 | Bruckert |
| 5,394,158 A | 2/1995 | Chia |
| 5,396,227 A | 3/1995 | Caroll |
| 5,398,190 A | 3/1995 | Wortham |
| 5,406,614 A | 4/1995 | Hara |
| 5,418,537 A | 5/1995 | Bird |
| 5,423,076 A | 6/1995 | Westengren |
| 5,434,789 A | 7/1995 | Fraker |
| 5,454,024 A | 9/1995 | Lebowitz |
| 5,461,390 A | 10/1995 | Hosher |
| 5,470,233 A | 11/1995 | Fruchterman |
| 5,479,408 A | 12/1995 | Will |
| 5,479,482 A | 12/1995 | Grimes |
| 5,485,161 A | 1/1996 | Vaughn |
| 5,485,163 A | 1/1996 | Singer |
| 5,488,563 A | 1/1996 | Chazelle |
| 5,494,091 A | 2/1996 | Freeman |
| 5,497,149 A | 3/1996 | Fast |
| 5,508,931 A | 4/1996 | Snider |
| 5,513,243 A | 4/1996 | Kage |
| 5,515,287 A | 5/1996 | Hakoyama |
| 5,519,403 A | 5/1996 | Bickley |
| 5,530,655 A | 6/1996 | Lokhoff et al. |
| 5,530,914 A | 6/1996 | McPheters |
| 5,532,690 A | 7/1996 | Hertel |
| 5,535,434 A | 7/1996 | Siddoway |
| 5,539,398 A | 7/1996 | Haall |
| 5,539,829 A | 7/1996 | Lokhoff et al. |
| 5,543,776 A | 8/1996 | L'Esperance |
| 5,552,772 A | 9/1996 | Janky |
| 5,555,286 A | 9/1996 | Tendler |
| 5,568,119 A | 10/1996 | Shippler |
| 5,574,648 A | 11/1996 | Pilley |
| 5,579,372 A | 11/1996 | Angstrom |
| 5,587,201 A | 12/1996 | Rho et al. |
| 5,588,009 A | 12/1996 | Will |
| 5,592,535 A | 1/1997 | Klotz |
| 5,604,486 A | 2/1997 | Lauro |
| 5,606,313 A | 2/1997 | Allen |
| 5,606,618 A | 2/1997 | Lokhoff et al. |
| 5,606,850 A | 3/1997 | Nakamura |
| 5,610,815 A | 3/1997 | Gudat |
| 5,614,890 A | 3/1997 | Fox |
| 5,615,116 A | 3/1997 | Gudat |
| 5,628,051 A | 5/1997 | Salin |
| 5,629,693 A | 5/1997 | Janky |
| 5,633,912 A | 5/1997 | Tsoi |
| 5,636,276 A | 6/1997 | Brugger |
| 5,661,755 A | 8/1997 | Van De Kerkhof et al. |
| 5,682,600 A | 10/1997 | Salin |
| 5,699,053 A | 12/1997 | Jonsson |
| 5,704,029 A | 12/1997 | Wright, Jr. |
| 5,712,900 A | 1/1998 | Maupin |
| 5,717,688 A | 2/1998 | Belanger et al. |
| 5,721,781 A | 2/1998 | Deo |
| 5,740,534 A | 4/1998 | Ayerst |
| 5,761,618 A | 6/1998 | Lynch |
| 5,765,152 A | 6/1998 | Erickson |
| 5,767,795 A | 6/1998 | Schaphorst |
| 5,768,509 A | 6/1998 | Gunluk |
| 5,771,353 A | 6/1998 | Eggleston |
| 5,774,533 A | 6/1998 | Patel |
| 5,774,670 A | 6/1998 | Muntully |
| 5,787,357 A | 7/1998 | Salin |
| 5,794,142 A | 8/1998 | Vantilla |
| 5,797,094 A | 8/1998 | Houde |
| 5,797,096 A | 8/1998 | Lupien |
| 5,802,492 A | 9/1998 | DeLorme |
| 5,806,000 A | 9/1998 | Vo |
| 5,809,415 A | 9/1998 | Rossman |
| 5,812,087 A | 9/1998 | Krasner |
| 5,822,700 A | 10/1998 | Hult |
| 5,828,740 A | 10/1998 | Khue |
| 5,841,396 A | 11/1998 | Kransner |
| 5,864,667 A | 1/1999 | Barkan |
| 5,874,914 A | 2/1999 | Krasner |
| 5,896,369 A | 4/1999 | Warsta |
| 5,920,821 A | 7/1999 | Seazholtz |
| 5,922,074 A | 7/1999 | Richard et al. |
| 5,930,250 A | 7/1999 | Klok |
| 5,930,701 A | 7/1999 | Skog |
| 5,943,399 A | 8/1999 | Bannister |
| 5,945,944 A | 8/1999 | Kraser |
| 5,946,629 A | 8/1999 | Sawyer |
| 5,946,630 A | 8/1999 | Willars |
| 5,950,130 A | 9/1999 | Coursey |
| 5,953,398 A | 9/1999 | Hill |
| 5,960,362 A | 9/1999 | Grob |
| 5,974,054 A | 10/1999 | Couts |
| 5,978,685 A | 11/1999 | Lahai |
| 5,983,099 A | 11/1999 | Yao et al. |
| 5,987,323 A | 11/1999 | Huotari |
| 5,998,111 A | 12/1999 | Abe |
| 5,999,124 A | 12/1999 | Sheynblat |
| 6,032,051 A | 2/2000 | Hall |
| 6,035,025 A | 3/2000 | Hanson |
| 6,049,710 A | 4/2000 | Nilsson |
| 6,052,081 A | 4/2000 | Krasner |
| 6,058,300 A | 5/2000 | Hanson |
| 6,058,338 A | 5/2000 | Agashe et al. |
| 6,061,018 A | 5/2000 | Sheynblat |
| 6,061,346 A | 5/2000 | Nordman |
| 6,064,336 A | 5/2000 | Krasner |
| 6,064,875 A | 5/2000 | Morgan |
| 6,070,067 A | 5/2000 | Nguyen et al. |
| 6,075,982 A | 6/2000 | Donovan |
| 6,081,229 A | 6/2000 | Soliman |
| 6,081,508 A | 6/2000 | West |
| 6,085,320 A | 7/2000 | Kaliski, Jr. |
| 6,101,378 A | 8/2000 | Barabash |
| 6,104,931 A | 8/2000 | Havinis |
| 6,122,503 A | 9/2000 | Daly |
| 6,122,520 A | 9/2000 | Want |
| 6,124,810 A | 9/2000 | Segal et al. |
| 6,128,664 A | 10/2000 | Yanagidate et al. |
| 6,131,067 A | 10/2000 | Girerd |
| 6,133,874 A | 10/2000 | Krasner |
| 6,134,316 A | 10/2000 | Kallioniemi |
| 6,134,483 A | 10/2000 | Vayanos et al. |

(56) References Cited

U.S. PATENT DOCUMENTS

| | | | |
|---|---|---|---|
| 6,148,197 | A | 11/2000 | Bridges |
| 6,148,198 | A | 11/2000 | Anderson |
| 6,149,353 | A | 11/2000 | Nillson |
| 6,150,980 | A | 11/2000 | Krasner |
| 6,169,891 | B1 | 1/2001 | Gorham |
| 6,173,181 | B1 | 1/2001 | Losh |
| 6,178,505 | B1 | 1/2001 | Schneider |
| 6,178,506 | B1 | 1/2001 | Quick, Jr. |
| 6,181,935 | B1 | 1/2001 | Gossman |
| 6,181,939 | B1 | 1/2001 | Ahvenainen |
| 6,185,427 | B1 | 2/2001 | Krasner |
| 6,188,354 | B1 | 2/2001 | Soliman et al. |
| 6,188,752 | B1 | 2/2001 | Wesley |
| 6,188,909 | B1 | 2/2001 | Alanara |
| 6,189,089 | B1 | 2/2001 | Walker et al. |
| 6,198,431 | B1 | 3/2001 | Gibson |
| 6,199,045 | B1 | 3/2001 | Giniger |
| 6,199,113 | B1 | 3/2001 | Alegre |
| 6,205,330 | B1 | 3/2001 | Windbladh |
| 6,208,290 | B1 | 3/2001 | Krasner |
| 6,208,854 | B1 | 3/2001 | Roberts |
| 6,215,441 | B1 | 4/2001 | Moeglein |
| 6,219,557 | B1 | 4/2001 | Havinis |
| 6,223,046 | B1 | 4/2001 | Hamill-Keays |
| 6,226,529 | B1 | 5/2001 | Bruno |
| 6,239,742 | B1 | 5/2001 | Krasner |
| 6,247,135 | B1 | 6/2001 | Feague |
| 6,249,680 | B1 | 6/2001 | Wax |
| 6,249,744 | B1 | 6/2001 | Morita |
| 6,249,783 | B1 | 6/2001 | Crone et al. |
| 6,253,074 | B1 | 6/2001 | Carlsson |
| 6,260,147 | B1 | 7/2001 | Quick, Jr. |
| 6,266,614 | B1 | 7/2001 | Alumbaugh |
| 6,275,692 | B1 | 8/2001 | Skog |
| 6,275,849 | B1 | 8/2001 | Ludwig |
| 6,275,937 | B1 | 8/2001 | Hailpern |
| 6,289,373 | B1 | 9/2001 | DeZonno |
| 6,307,504 | B1 | 10/2001 | Sheynblat |
| 6,308,269 | B2 | 10/2001 | Proidl |
| 6,313,786 | B1 | 11/2001 | Sheynblat et al. |
| 6,317,594 | B1 | 11/2001 | Gossman |
| 6,321,091 | B1 | 11/2001 | Holland |
| 6,321,250 | B1 | 11/2001 | Knape |
| 6,321,257 | B1 | 11/2001 | Kotola |
| 6,324,542 | B1 | 11/2001 | Wright, Jr. |
| 6,327,473 | B1 | 12/2001 | Soliman et al. |
| 6,327,479 | B1 | 12/2001 | Mikkola |
| 6,333,919 | B2 | 12/2001 | Gafney |
| 6,367,019 | B1 | 4/2002 | Ansell |
| 6,370,389 | B1 | 4/2002 | Isomursu |
| 6,377,209 | B1 | 4/2002 | Krasner |
| 6,400,314 | B1 | 6/2002 | Krasner |
| 6,400,958 | B1 | 6/2002 | Isomursu |
| 6,411,254 | B1 | 6/2002 | Moeglein |
| 6,421,002 | B2 | 7/2002 | Krasner |
| 6,433,734 | B1 | 8/2002 | Krasner |
| 6,449,473 | B1 | 9/2002 | Raivisto |
| 6,449,476 | B1 | 9/2002 | Hutchison, IV |
| 6,456,852 | B2 | 9/2002 | Bar |
| 6,477,150 | B1 | 11/2002 | Maggenti |
| 6,504,491 | B1 | 1/2003 | Christians |
| 6,505,049 | B1 | 1/2003 | Dorenbosch |
| 6,510,387 | B2 | 1/2003 | Fuchs et al. |
| 6,512,922 | B1 | 1/2003 | Burg et al. |
| 6,512,930 | B2 | 1/2003 | Sandegren |
| 6,515,623 | B2 | 2/2003 | Johnson |
| 6,519,466 | B2 | 2/2003 | Pande et al. |
| 6,522,682 | B1 | 2/2003 | Kohli et al. |
| 6,529,490 | B1 | 3/2003 | Oh |
| 6,529,722 | B1 | 3/2003 | Heinrich |
| 6,529,829 | B2 | 3/2003 | Turetzky et al. |
| 6,531,982 | B1 | 3/2003 | White et al. |
| 6,538,757 | B1 | 3/2003 | Sansone |
| 6,539,200 | B1 | 3/2003 | Schiff |
| 6,539,304 | B1 | 3/2003 | Chansarkar |
| 6,542,464 | B1 | 4/2003 | Takeda |
| 6,542,734 | B1 | 4/2003 | Abrol et al. |
| 6,542,743 | B1 | 4/2003 | Soliman |
| 6,549,522 | B1 | 4/2003 | Flynn |
| 6,549,776 | B1 | 4/2003 | Joong |
| 6,549,844 | B1 | 4/2003 | Egberts |
| 6,556,832 | B1 | 4/2003 | Soliman |
| 6,560,534 | B2 | 5/2003 | Abraham et al. |
| 6,570,530 | B2 | 5/2003 | Gaal et al. |
| 6,571,095 | B1 | 5/2003 | Koodli |
| 6,574,558 | B2 | 6/2003 | Kohli |
| 6,584,307 | B1 | 6/2003 | Antonucci |
| 6,584,552 | B1 | 6/2003 | Kuno |
| 6,594,500 | B2 | 7/2003 | Bender et al. |
| 6,597,311 | B2 | 7/2003 | Sheynblat et al. |
| 6,600,927 | B2 | 7/2003 | Hamilton |
| 6,606,495 | B1 | 8/2003 | Korpi et al. |
| 6,606,554 | B2 | 8/2003 | Edge |
| 6,609,004 | B1 | 8/2003 | Morse et al. |
| 6,611,757 | B2 | 8/2003 | Brodie |
| 6,618,670 | B1 | 9/2003 | Chansarkar |
| 6,621,452 | B2 | 9/2003 | Knockeart et al. |
| 6,621,810 | B1 | 9/2003 | Leung |
| 6,628,233 | B2 | 9/2003 | Knockeart et al. |
| 6,630,093 | B1 | 10/2003 | Jones |
| 6,633,255 | B2 | 10/2003 | Krasner |
| 6,640,184 | B1 | 10/2003 | Rabe |
| 6,650,901 | B1 | 11/2003 | Schuster |
| 6,661,372 | B1 | 12/2003 | Girerd |
| 6,665,539 | B2 | 12/2003 | Sih et al. |
| 6,665,541 | B1 | 12/2003 | Krasner et al. |
| 6,671,620 | B1 | 12/2003 | Garin et al. |
| 6,675,017 | B1 | 1/2004 | Zellner |
| 6,677,894 | B2 | 1/2004 | Sheynblat et al. |
| 6,678,357 | B2 | 1/2004 | Stumer |
| 6,680,694 | B1 | 1/2004 | Knockeart et al. |
| 6,680,695 | B2 | 1/2004 | Turetzky et al. |
| 6,694,258 | B2 | 2/2004 | Johnson et al. |
| 6,697,629 | B1 | 2/2004 | Grilli et al. |
| 6,701,144 | B2 | 3/2004 | Kirbas et al. |
| 6,703,971 | B2 | 3/2004 | Pande et al. |
| 6,703,972 | B2 | 3/2004 | van Diggelmen |
| 6,704,651 | B2 | 3/2004 | van Diggelmen |
| 6,707,421 | B1 | 3/2004 | Drury et al. |
| 6,714,793 | B1 | 3/2004 | Carey et al. |
| 6,718,174 | B2 | 4/2004 | Vayanos |
| 6,720,915 | B2 | 4/2004 | Sheynblat |
| 6,721,396 | B2 | 4/2004 | Chin |
| 6,721,578 | B2 | 4/2004 | Minear et al. |
| 6,721,871 | B2 | 4/2004 | Piispanen |
| 6,724,342 | B2 | 4/2004 | Bloebaum et al. |
| 6,725,159 | B2 | 4/2004 | Krasner |
| 6,731,940 | B1 | 5/2004 | Nagendran |
| 6,734,821 | B2 | 5/2004 | van Diggelen |
| 6,738,013 | B2 | 5/2004 | Orler |
| 6,738,800 | B1 | 5/2004 | Aquilon |
| 6,741,842 | B2 | 5/2004 | Goldberg et al. |
| 6,744,856 | B2 | 6/2004 | Karnik |
| 6,744,858 | B1 | 6/2004 | Ryan |
| 6,745,038 | B2 | 6/2004 | Callaway |
| 6,747,596 | B2 | 6/2004 | Orler |
| 6,748,195 | B1 | 6/2004 | Philips |
| 6,751,464 | B1 | 6/2004 | Burg et al. |
| 6,756,938 | B2 | 6/2004 | Zhao et al. |
| 6,757,266 | B1 | 6/2004 | Hundscheidt |
| 6,757,544 | B2 | 6/2004 | Rangarajan et al. |
| 6,771,742 | B2 | 8/2004 | McCalmont |
| 6,772,340 | B1 | 8/2004 | Peinado |
| 6,775,655 | B1 | 8/2004 | Peinado |
| 6,775,802 | B2 | 8/2004 | Gaal |
| 6,778,136 | B2 | 8/2004 | Groneneyer |
| 6,778,885 | B2 | 8/2004 | Agashe et al. |
| 6,781,963 | B2 | 8/2004 | Crockett |
| 6,788,249 | B1 | 9/2004 | Farmer et al. |
| 6,795,699 | B1 | 9/2004 | McCraw et al. |
| 6,799,049 | B1 | 9/2004 | Zellner |
| 6,799,050 | B1 | 9/2004 | Krasner |
| 6,801,159 | B2 | 10/2004 | Swope et al. |
| 6,804,524 | B1 | 10/2004 | Vandermeijjden |

(56) References Cited

U.S. PATENT DOCUMENTS

| | | |
|---|---|---|
| 6,808,534 B1 | 10/2004 | Escano |
| 6,810,323 B1 | 10/2004 | Bullock et al. |
| 6,813,560 B2 | 11/2004 | van Diggelen |
| 6,816,111 B2 | 11/2004 | Krasner |
| 6,816,710 B2 | 11/2004 | Krasner |
| 6,816,719 B1 | 11/2004 | Heinonen |
| 6,816,734 B2 | 11/2004 | Wong et al. |
| 6,820,069 B1 | 11/2004 | Kogan |
| 6,829,475 B1 | 12/2004 | Lee et al. |
| 6,832,373 B2 | 12/2004 | O'Neil |
| 6,839,020 B2 | 1/2005 | Geir et al. |
| 6,839,021 B2 | 1/2005 | Sheynblat et al. |
| 6,842,715 B1 | 1/2005 | Gaal |
| 6,853,916 B2 | 2/2005 | Fuchs et al. |
| 6,856,282 B2 | 2/2005 | Mauro et al. |
| 6,861,980 B1 | 3/2005 | Rowitch et al. |
| 6,865,171 B1 | 3/2005 | Nilsson |
| 6,865,395 B2 | 3/2005 | Riley |
| 6,867,734 B2 | 3/2005 | Voor |
| 6,873,854 B2 | 3/2005 | Crockett |
| 6,885,940 B2 | 4/2005 | Brodie et al. |
| 6,888,497 B2 | 5/2005 | King et al. |
| 6,888,932 B2 | 5/2005 | Snip |
| 6,895,238 B2 | 5/2005 | Nevell et al. |
| 6,895,249 B2 | 5/2005 | Gaal |
| 6,900,758 B1 | 5/2005 | Mann et al. |
| 6,903,684 B1 | 6/2005 | Simic et al. |
| 6,904,029 B2 | 6/2005 | Fors et al. |
| 6,907,224 B2 | 6/2005 | Younis |
| 6,907,238 B2 | 6/2005 | Leung |
| 6,912,395 B2 | 6/2005 | Benes et al. |
| 6,912,545 B1 | 6/2005 | Lundy |
| 6,915,208 B2 | 7/2005 | Garin et al. |
| 6,917,331 B2 | 7/2005 | Groneneyer |
| 6,925,504 B1 | 8/2005 | Liskov |
| 6,930,634 B2 | 8/2005 | Peng et al. |
| 6,937,187 B2 | 8/2005 | van Diggelen |
| 6,937,597 B1 | 8/2005 | Rosenburg |
| 6,937,872 B2 | 8/2005 | Krasner |
| 6,940,950 B2 | 9/2005 | Dickinson |
| 6,941,144 B2 | 9/2005 | Stein |
| 6,944,540 B2 | 9/2005 | King et al. |
| 6,947,772 B2 | 9/2005 | Minear et al. |
| 6,950,058 B1 | 9/2005 | Davis et al. |
| 6,957,073 B2 | 10/2005 | Bye |
| 6,961,019 B1 | 11/2005 | McConnell et al. |
| 6,961,562 B2 | 11/2005 | Ross |
| 6,963,557 B2 | 11/2005 | Knox |
| 6,965,754 B2 | 11/2005 | King |
| 6,965,767 B2 | 11/2005 | Maggenti |
| 6,968,195 B2 | 11/2005 | Nowak |
| 6,970,917 B1 | 11/2005 | Kushwaha |
| 6,973,320 B2 | 12/2005 | Brown et al. |
| 6,975,266 B2 | 12/2005 | Abraham et al. |
| 6,978,453 B2 | 12/2005 | Rao |
| 6,980,816 B2 | 12/2005 | Rohles |
| 6,996,720 B1 | 2/2006 | DeMello |
| 6,999,782 B2 | 2/2006 | Shaughnessy |
| 7,020,480 B2 | 3/2006 | Coskun |
| 7,024,321 B1 | 4/2006 | Deninger et al. |
| 7,024,393 B1 | 4/2006 | Peinado |
| 7,047,411 B1 | 5/2006 | DeMello |
| 7,065,351 B2 | 6/2006 | Carter et al. |
| 7,065,507 B2 | 6/2006 | Momammed |
| 7,079,857 B2 | 7/2006 | Maggenti |
| 7,092,385 B2 | 8/2006 | Gallant |
| 7,103,018 B1 | 9/2006 | Hansen |
| 7,103,574 B1 | 9/2006 | Peinado |
| 7,106,717 B2 | 9/2006 | Rousseau |
| 7,136,838 B1 | 11/2006 | Peinado |
| 7,151,946 B2 | 12/2006 | Maggenti |
| 7,200,380 B2 | 4/2007 | Havlark |
| 7,209,969 B2 | 4/2007 | Lahti |
| 7,218,940 B2 | 5/2007 | Niemenmaa |
| 7,221,959 B2 | 5/2007 | Lindqvist |
| 7,246,187 B1 | 7/2007 | Erza |
| 7,260,186 B2 | 8/2007 | Zhu |
| 7,277,938 B2 | 10/2007 | Duimovich |
| 7,321,773 B2 | 1/2008 | Hines |
| 7,366,157 B1 | 4/2008 | Valentine |
| 7,440,442 B2 | 10/2008 | Grabelsky |
| 7,516,198 B1 | 4/2009 | Appala |
| 7,522,581 B2 | 4/2009 | Acharya |
| 7,526,563 B2 | 4/2009 | Ingimundarson |
| 7,573,982 B2 | 8/2009 | Breen |
| 7,623,447 B1 | 11/2009 | Faccin |
| 7,627,331 B2 | 12/2009 | Winterbottom |
| 7,684,782 B2 | 3/2010 | Ashly |
| 7,702,081 B1 | 4/2010 | Klesper |
| 7,783,297 B2 | 8/2010 | Ishii |
| 7,822,391 B1 | 10/2010 | Delker |
| 7,822,871 B2 | 10/2010 | Stolorz |
| 7,895,263 B1 | 2/2011 | Kirchmeier |
| 8,014,945 B2 | 9/2011 | Cooper |
| 2002/0037735 A1 | 3/2002 | Maggenti |
| 2002/0052214 A1 | 5/2002 | Maggenti |
| 2002/0058515 A1 | 5/2002 | Holler |
| 2002/0061760 A1 | 5/2002 | Maggenti |
| 2002/0069079 A1 | 6/2002 | Vega |
| 2002/0069259 A1 | 6/2002 | Kushwaha |
| 2002/0085538 A1 | 7/2002 | Leung |
| 2002/0086659 A1 | 7/2002 | Lauper |
| 2002/0099802 A1 | 7/2002 | March |
| 2002/0102999 A1 | 8/2002 | Maggenti |
| 2002/0112047 A1 | 8/2002 | Kushwaha |
| 2002/0113797 A1 | 8/2002 | Potter |
| 2002/0141386 A1 | 10/2002 | Minert |
| 2002/0154221 A1 | 10/2002 | Ishimaru |
| 2002/0174073 A1 | 11/2002 | Nordman |
| 2002/0197991 A1 | 12/2002 | Anvekar |
| 2003/0009602 A1 | 1/2003 | Jacobs |
| 2003/0016804 A1 | 1/2003 | Sheha |
| 2003/0037163 A1 | 2/2003 | Kitada et al. |
| 2003/0063730 A1 | 4/2003 | Woodring |
| 2003/0065788 A1 | 4/2003 | Salomaki |
| 2003/0072318 A1 | 4/2003 | Lam |
| 2003/0078064 A1 | 4/2003 | Chan |
| 2003/0078886 A1 | 4/2003 | Minear |
| 2003/0081557 A1 | 5/2003 | Mettala |
| 2003/0081752 A1 | 5/2003 | Trandal |
| 2003/0086539 A1 | 5/2003 | McCalmont |
| 2003/0101329 A1 | 5/2003 | Lahti |
| 2003/0103484 A1 | 6/2003 | Oommen |
| 2003/0114148 A1 | 6/2003 | Albertsson |
| 2003/0115328 A1 | 6/2003 | Saliminen |
| 2003/0125045 A1 | 7/2003 | Riley |
| 2003/0137961 A1 | 7/2003 | Tsirtsis |
| 2003/0153340 A1 | 8/2003 | Crockett |
| 2003/0153341 A1 | 8/2003 | Crockett |
| 2003/0153342 A1 | 8/2003 | Crockett |
| 2003/0153343 A1 | 8/2003 | Crockett |
| 2003/0161298 A1 | 8/2003 | Bergman |
| 2003/0163483 A1 | 8/2003 | Zingher |
| 2003/0186709 A1* | 10/2003 | Rhodes et al. ............. 455/456.1 |
| 2003/0187803 A1 | 10/2003 | Pitt |
| 2003/0196105 A1 | 10/2003 | Fineberg |
| 2003/0204640 A1 | 10/2003 | Sahinoja |
| 2003/0222901 A1 | 12/2003 | Houck |
| 2003/0223381 A1 | 12/2003 | Schrodens |
| 2004/0002326 A1 | 1/2004 | Maher |
| 2004/0044623 A1 | 3/2004 | Wake |
| 2004/0068724 A1 | 4/2004 | Gardner |
| 2004/0093217 A1 | 5/2004 | Yeh |
| 2004/0098497 A1 | 5/2004 | Banet |
| 2004/0107143 A1 | 6/2004 | Niemi |
| 2004/0132465 A1 | 7/2004 | Mattila |
| 2004/0146040 A1 | 7/2004 | Phan-Anh |
| 2004/0156394 A1 | 8/2004 | Westman |
| 2004/0157175 A1 | 8/2004 | Matsumoto |
| 2004/0163104 A1 | 8/2004 | Warden |
| 2004/0176123 A1 | 9/2004 | Chin |
| 2004/0184584 A1 | 9/2004 | McCalmont |
| 2004/0203732 A1 | 10/2004 | Brusilovsky |
| 2004/0205151 A1 | 10/2004 | Sprigg |

(56) References Cited

U.S. PATENT DOCUMENTS

| | | |
|---|---|---|
| 2004/0215687 A1 | 10/2004 | Klemba |
| 2004/0225740 A1 | 11/2004 | Klemba |
| 2004/0229632 A1 | 11/2004 | Flynn |
| 2004/0242238 A1 | 12/2004 | Wang |
| 2004/0267445 A1 | 12/2004 | De Luca |
| 2005/0021769 A1 | 1/2005 | Kim |
| 2005/0028034 A1 | 2/2005 | Gantman |
| 2005/0031095 A1 | 2/2005 | Pietrowicz |
| 2005/0039178 A1 | 2/2005 | Marolia |
| 2005/0041578 A1 | 2/2005 | Huotari |
| 2005/0043037 A1 | 2/2005 | Loppe |
| 2005/0043038 A1 | 2/2005 | Maanoja |
| 2005/0047399 A1 | 3/2005 | Lee et al. |
| 2005/0053209 A1 | 3/2005 | D'Evelyn |
| 2005/0071251 A1 | 3/2005 | Linden |
| 2005/0086467 A1 | 4/2005 | Asokan |
| 2005/0111630 A1 | 5/2005 | Potorny |
| 2005/0119012 A1 | 6/2005 | Merheb |
| 2005/0135569 A1 | 6/2005 | Dickinson |
| 2005/0153706 A1 | 7/2005 | Niemenmaa |
| 2005/0169248 A1 | 8/2005 | Truesdale |
| 2005/0190892 A1 | 9/2005 | Dawson |
| 2005/0201358 A1* | 9/2005 | Nelson et al. ............... 370/352 |
| 2005/0201528 A1 | 9/2005 | Meer |
| 2005/0201529 A1 | 9/2005 | Nelson |
| 2005/0209995 A1 | 9/2005 | Aksu |
| 2005/0213537 A1 | 9/2005 | Ingimundarson |
| 2005/0213716 A1 | 9/2005 | Zhu |
| 2005/0215233 A1 | 9/2005 | Perera |
| 2005/0216300 A1 | 9/2005 | Appleman |
| 2005/0259675 A1 | 11/2005 | Tuohino |
| 2005/0282518 A1 | 12/2005 | D'Evelyn |
| 2005/0287979 A1 | 12/2005 | Rollender |
| 2006/0044407 A1 | 3/2006 | Barbeau |
| 2006/0053225 A1 | 3/2006 | Poikselka |
| 2006/0058951 A1 | 3/2006 | Cooper |
| 2006/0068753 A1* | 3/2006 | Karpen et al. ............. 455/404.2 |
| 2006/0079236 A1 | 4/2006 | Del Pino |
| 2006/0099935 A1 | 5/2006 | Gallagher |
| 2006/0106774 A1 | 5/2006 | Cohen |
| 2006/0128395 A1 | 6/2006 | Muhonen |
| 2006/0135177 A1 | 6/2006 | Winterbottom |
| 2006/0154665 A1 | 7/2006 | Svensson |
| 2006/0184617 A1 | 8/2006 | Nicholas |
| 2006/0189303 A1 | 8/2006 | Rollender |
| 2006/0205383 A1 | 9/2006 | Rollender |
| 2006/0206610 A1 | 9/2006 | Ling |
| 2006/0212558 A1 | 9/2006 | Sahinoja |
| 2006/0212562 A1 | 9/2006 | Kushwaha |
| 2006/0224752 A1 | 10/2006 | Perekh |
| 2006/0234639 A1 | 10/2006 | Kushwaha |
| 2006/0234698 A1 | 10/2006 | Folk |
| 2006/0239205 A1 | 10/2006 | Warren |
| 2006/0258380 A1 | 11/2006 | Liebowitz |
| 2006/0281470 A1 | 12/2006 | Shi |
| 2006/0293066 A1 | 12/2006 | Edge |
| 2007/0004429 A1 | 1/2007 | Edge |
| 2007/0010248 A1 | 1/2007 | Dravida |
| 2007/0021098 A1 | 1/2007 | Rhodes |
| 2007/0026854 A1 | 2/2007 | Nash |
| 2007/0026871 A1 | 2/2007 | Wager |
| 2007/0027997 A1 | 2/2007 | Polk |
| 2007/0030539 A1 | 2/2007 | Nath |
| 2007/0041513 A1 | 2/2007 | Gende |
| 2007/0049288 A1 | 3/2007 | Lamprecht |
| 2007/0060097 A1 | 3/2007 | Edge |
| 2007/0104183 A1 | 5/2007 | Bakke |
| 2007/0117574 A1 | 5/2007 | Watanabe |
| 2007/0117577 A1 | 5/2007 | Harris |
| 2007/0135089 A1 | 6/2007 | Edge |
| 2007/0149166 A1 | 6/2007 | Turcotte |
| 2007/0149213 A1 | 6/2007 | Lamba |
| 2007/0160036 A1 | 7/2007 | Smith |
| 2007/0190968 A1 | 8/2007 | Dickinson |
| 2007/0201623 A1 | 8/2007 | Hines |
| 2007/0218871 A1 | 9/2007 | Bonner |
| 2007/0253429 A1 | 11/2007 | James |
| 2007/0254625 A1 | 11/2007 | Edge |
| 2007/0291733 A1 | 12/2007 | Doran |
| 2008/0045250 A1* | 2/2008 | Hwang ..................... 455/466 |
| 2008/0137624 A1 | 6/2008 | Silverstrim |
| 2008/0162637 A1 | 7/2008 | Adamczyk |
| 2008/0176582 A1 | 7/2008 | Ghai |
| 2008/0192731 A1 | 8/2008 | Dickinson |
| 2008/0208671 A1 | 8/2008 | Ehrlich |
| 2008/0268809 A1 | 10/2008 | Busin |
| 2008/0313000 A1 | 12/2008 | Degeratu |
| 2009/0003535 A1 | 1/2009 | Grabelsky |
| 2009/0067417 A1 | 3/2009 | Kalavade |
| 2009/0097450 A1 | 4/2009 | Wallis |
| 2009/0128404 A1 | 5/2009 | Martino |
| 2009/0020447 A1 | 8/2009 | Elenbass |
| 2009/0198733 A1 | 8/2009 | Gounares |
| 2009/0204600 A1 | 8/2009 | Kalik |
| 2009/0221263 A1 | 9/2009 | Titus |
| 2009/0237210 A1 | 9/2009 | Ciesla |
| 2010/0010860 A1 | 1/2010 | Bose |
| 2010/0054220 A1 | 3/2010 | Bischinger et al. |
| 2010/0067444 A1 | 3/2010 | Faccin |
| 2010/0076767 A1 | 3/2010 | Vieri |
| 2010/0167760 A1 | 7/2010 | Kim |
| 2010/0198933 A1* | 8/2010 | Smith et al. ............... 709/206 |
| 2010/0223222 A1 | 9/2010 | Zhou et al. |
| 2010/0233991 A1 | 9/2010 | Crawford |
| 2010/0262668 A1 | 10/2010 | Piett |
| 2011/0207429 A1 | 8/2011 | Maier |
| 2012/0079600 A1 | 3/2012 | Kellerman |
| 2013/0012232 A1 | 1/2013 | Titus et al. |

OTHER PUBLICATIONS

European Search Report in Appl. No. EP07 71 6216 dated Dec. 12, 2009.

Zehua et al., "On Querying Geospatial and Georeferenced Metadata Resources in G-Portal," IEEE Comp. SOC, May 31, 2003, pp. 245-255.

Peterson et al., "A Presence-Based GEOPRIV Location Object Format; rfc4119,txt," Neustar, Dec. 1, 2005, pp. 1-23.

Winterbottom, et al., "GEOPRIV PIDF-Lo Usage Clarification, Considerations and Recommendations; draft-ietf-geopriv-pdif-lo-profile-00.txt," Nortel, Jul. 2, 2005, pp. 1-31.

Berners-Lee, et al., "Uniform Resource Identifier (URI) Generic Standard, Internet Engineering Task Force," Day Software, Jan. 1, 2005, pp. 1-61.

47 code of federal regulations (Oct. 1, 2005 Edition).

Schulzrinne et al., Emergency Services for Internet Telephony Systems draft-schulzrinne-sipping-emergency-arch, IETF Standard Working Draft, Feb. 4, 2004, 1-22.

International Search Report received in PCT/US2008/10828 dated Nov. 21, 2008.

U.S. Appl. No. 09/539,495, filed Mar. 2000, Abrol.

International Search Report received in PCT/US2011/02001 dated Apr. 17, 2012.

International Search Report received in PCT/US2012/067857 dated Feb. 20, 2013.

International Search Report received in PCT/US2012/67689 dated Feb. 22, 2013.

International Search Report received in PCT/US2012/066313 dated Feb. 4, 2013.

International Search Report received in PCT/US2012/000100 dated Apr. 24, 2012.

International Search Report received in PCT/US2012/00266 dated Aug. 3, 3012.

* cited by examiner

US 8,874,068 B2

EMERGENCY 911 DATA MESSAGING

This application is a division of U.S. patent application Ser. No. 12/232,417, entitled "Emergency 911 Data Messaging," filed on Sep. 17, 2008; which claims priority from U.S. Provisional Application No. 60/960,119, to Mitchell, Jr., et al., entitled "Routing SMS Messages Upon Location in a CDMA Network For Emergency Services", filed Sep. 17, 2007, the entirety of which is are expressly incorporated herein by reference.

BACKGROUND OF THE INVENTION

1. Field of the Invention

This invention relates generally to telecommunications. More particularly, it relates to wireless messaging and wireless emergency services such as E911.

2. Background of the Related Art 9-1-1 is a phone number widely recognized in North America as an emergency phone number that is used to contact emergency dispatch personnel. Enhanced 9-1-1 (E9-1-1) is defined by an emergency call being selectively routed to an appropriate public service access point (PSAP), based on a special identifier (P-ANI, or "Pseudo Automatic Number Identifier", also referred to as "ESxK"), and includes the transmission of callback number and location information when 9-1-1 is used. E9-1-1 may be implemented for landline, cellular or VoIP networks. A Public Service Answering Point (PSAP) is a dispatch office that receives 9-1-1 calls from the public. A PSAP may be a local, fire or police department, an ambulance service or a regional office covering all services. As used herein, the term "PSAP" refers to either a public safety access point (PSAP), or to an Emergency Call Center (ECC), a VoIP term.

Regardless of the network type, a 9-1-1 service becomes E-9-1-1 when automatic number identification and automatic location information related to the call is provided to the 9-1-1 operator at the PSAP. A primary challenge results from the fact that calls may arrive at the PSAP without the caller's actual callback number or location information displayed at the emergency operator's terminal.

The result of an E911 call is a direct circuit connection between the requestor and the responder. 911 is further enhanced with the ability to deliver location information over a data channel in parallel to the emergency call. This data is typically staged in a database that is queried by the PSAP to determine location information.

FIG. 3 depicts an overview of conventional enhanced 9-1-1 (E9-1-1) voice call flow in currently deployed architecture.

In particular, as shown in FIG. 3, an emergency voice call is initiated at a mobile station or handset 102, delivered through a relevant radio tower and base station 104 to a Mobile Switching Center (MSC) 206. The emergency voice call is then held while call setup information is delivered to a location center 222. The location center 222 responds to the MSC 206 with appropriate call routing information, and triggers a request for precise location. The MSC 206 releases the call and routes it to the correct PSAP through a selective router 210 based on information provided from the location center 222. The location center 222 then stages a record in an automatic location information (ALI) database 214. When the precise location information is returned to the location center 222 from a position determining entity 226, this location coordinate information is compared to a coordinate routing database 224, and the matching address and call back information is then staged for retrieval by the ALI database 214.

The current 911 infrastructure was designed to route a voice emergency call to the local PSAP. Unfortunately, this requires that voice circuits be available to carry the emergency call. During times of regional crises, such as a hurricane, the local wireless infrastructure can become overloaded by call volume. This was experienced during the September 11th terrorist attacks during which voice telecommunications along the East Coast was subject to service failures.

SUMMARY OF THE INVENTION

In accordance with the principles of the present invention, an emergency system short messaging system (SMS) location proxy comprises an interface between the SMS location proxy and a short messaging service center (SMSC), and an interface to an emergency services provider. A module provides location information relating to an emergency services data message routed via the SMSC and directed toward the emergency services provider.

In accordance with another embodiment of the present invention, apparatus for providing 911 equivalent data emergency services comprises a short messaging system (SMS) location proxy to provide location information relating to an emergency data message. A module receives a request for location of a data message, and a module provides requested location of a data message to an emergency services provider. In this way, data emergency services are provided using a non-persistent connection with an emergency data initiator.

In accordance with yet another embodiment of the present invention, 911 equivalent data emergency services are provided to an emergency data initiator using a non-persistent connection by associating a request for location relating to a non-persistent emergency data message with a geo-location. The request for location is delivered to an appropriate emergency services provider in a format useable by the emergency services provider. Location information is staged for use by the emergency services provider.

BRIEF DESCRIPTION OF THE DRAWINGS

Features and advantages of the present invention will become apparent to those skilled in the art from the following description with reference to the drawings.

DETAILED DESCRIPTION OF ILLUSTRATIVE EMBODIMENTS

Short message system (SMS) technology is available to generate SMS traffic from a handset and deliver the message to another handset or to an Internet Address. There is also a wireline SMS capability that has been introduced to deliver an SMS message to non-SMS enabled devices. But SMS is not a persistent connection, and there is no conventional location capability associated with SMS. Moreover, conventional technologies do not have the capability to deliver SMS messages to a PSAP.

Public service answering point (PSAP) connectivity to the public switched telephone network (PSTN) is managed through dedicated switches called emergency services gateways (ESGW) that conventionally can not be directly dialed and do not support SMS traffic. Even if the switches were able to support the delivery of SMS to the PSAP, there is no currently available method for the PSAP to process and display or use the information from an SMS.

The inventors of the present invention have empirically recognized that during times of voice circuit overload, the signaling system No. 7 (SS7) signaling network had excess capacity available to carry short message traffic. The present invention enables a Short Message Service (SMS) capability for generating an emergency 911 "equivalent" call. This capability enables SMS savvy consumers to generate requests for assistance to the local Public Safety Answering Point (PSAP) that can be understood and translated to provide first responders with the information they need to offer timely assistance.

This invention offers a solution architecture and method for delivery of 911 equivalent requests for emergency assistance using non-voice centric, and importantly non-persistent connectivity sources such as SMS, email, and autonomous data/message generation devices.

According to the principles of the present invention, a data request is generated (e.g., text, email, SMS, multimedia messaging system (MMS), etc.) from a source device. The data request is delivered to a PSAP or other emergency monitoring service location in a useable format. Exemplary useable formats include a canned voice message, delivery to a call center that translates data to voice, text to speech, and text to instant messaging (IM). Additional information and location are staged for use by the PSAP or other monitoring service location.

An overview of the invention for data 911 is now described. While some similarities to conventional voice based persistent circuit technologies exist, the inventive data 911 call flow is broken down into more detail in subsequent sections to specifically delineate significant differences and uniqueness of the invention.

Figure 1:
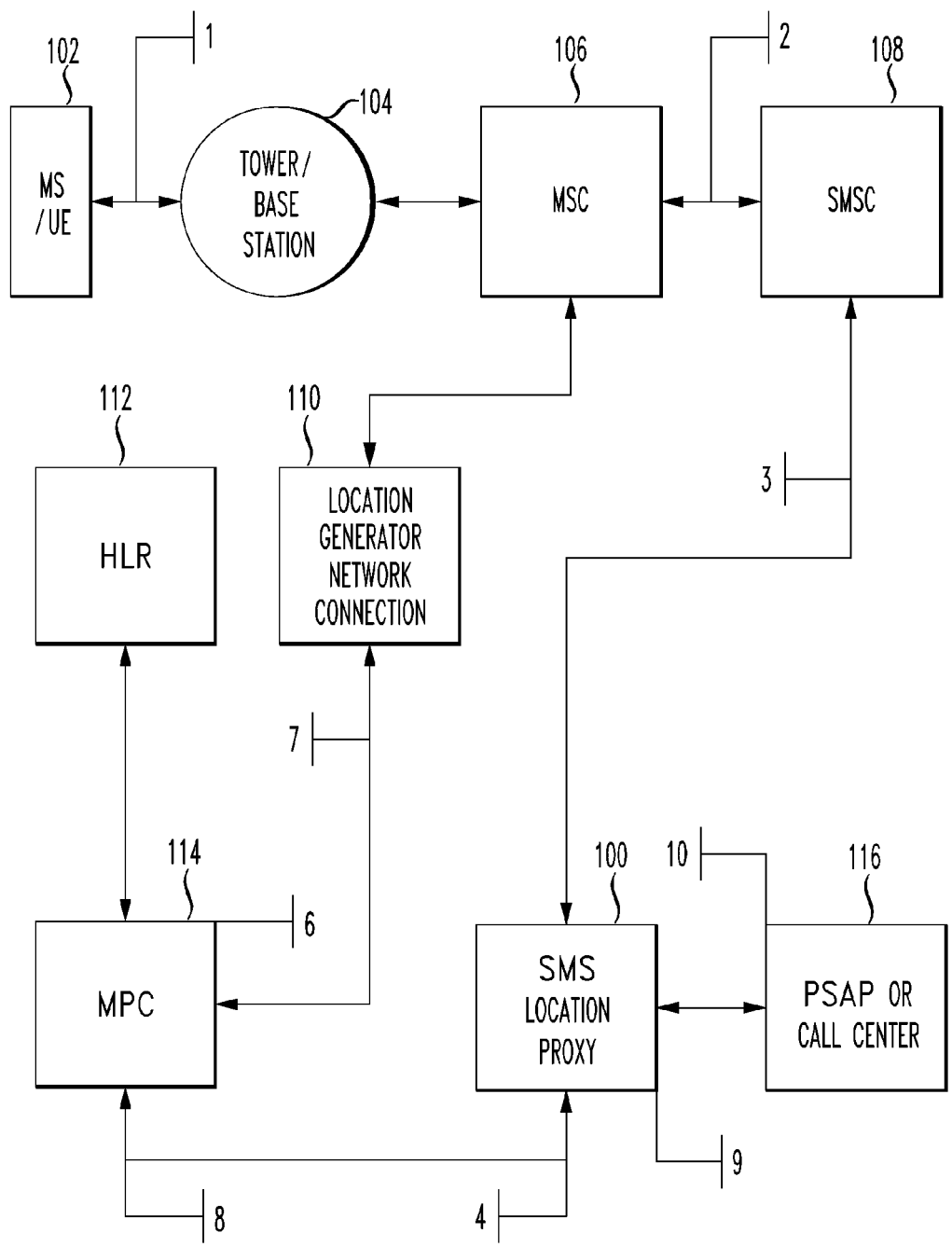
FIG. 1 depicts an exemplary embodiment for generating an E9-1-1 text message with geographic location information for delivery to a PSAP, in accordance with the principles of the present invention.

FIG. 1 depicts an exemplary embodiment for generating an E9-1-1 text message with geographic location information for delivery to a PSAP, in accordance with the principles of the present invention.

In particular, as shown in FIG. 1, an example of the invention based on use of Short Message technology is presented. In this example, the source of the emergency data message is a handset type of device 102 also capable of making a voice call. However, while the handset device 102 sends a text message addressed by the user/caller simply as 911 instead of dialing a phone number.

In call flow, the 911 emergency text message from the mobile station/user equipment (MS/UE), or handset, 102 traverses the radio network and the base station controller 104, and then is delivered to the mobile switching center (MSC) 106. The MSC 106 routes the 911 emergency text message to an SMS platform (SMSC) 108.

In step 1 of FIG. 1, a user on a handset 102 sends an emergency data message (e.g., text) via their servicing Short-Message-Service (SMS) network addressed simply to "911" or other designated Emergency Services Identity. In the given example, the source of the emergency data message has a preferable form of MSISDN@carrierdomain.com, though any appropriate unique address scheme unique to the handset 102 or specific user is possible.

In step 2, the exemplary emergency SMS data message (e.g., "Help me!") is routed from the MSC 106 to the relevant SMSC 108.

In step 3, the SMSC 108 routes the exemplary emergency SMS data message to the SMS location proxy 100.

In step 4, the SMS location proxy 100 initiates a request for routing to the MPC 114. The emergency SMS data message originating MSISDN and the identity of the carrier is sent to a mobile positioning center (MPC) 114 with the request for routing.

In step 5, the MPC 114 receives the request for routing, and then requests information from the network using the current method to derive the remaining information necessary to request location from the network.

In step 6, the MPC 114 then requests information about the precise latitude/longitude (lat/lon) and/or rough position (tower/sector) of the emergency texter. The request for routing preferably includes an indicator of "Emergency Services" or similar designation.

In step 7, the network calculates the position of the emergency texter and returns this information to the MPC 114.

In step 8, the MPC 114 uses the "rough" location information (or optionally: the precise) to determine the routing necessary for the emergency SMS data message, and returns a route destination to the SMS location proxy 100.

In step 9, the SMS location proxy 100 routes the emergency SMS data message (+appended Location Information—Rough and Precise (when available) to the appropriate PSAP or call center 116.

In step 10, the emergency texting user or emergency text message initiator is messaged that their emergency SMS data message has been received. An instant messaging (IM)-like non-persistent connection is made between the PSAP or call center 116 and the emergency texting user or emergency text message initiator through the SMS location proxy 100.

Figure 2:
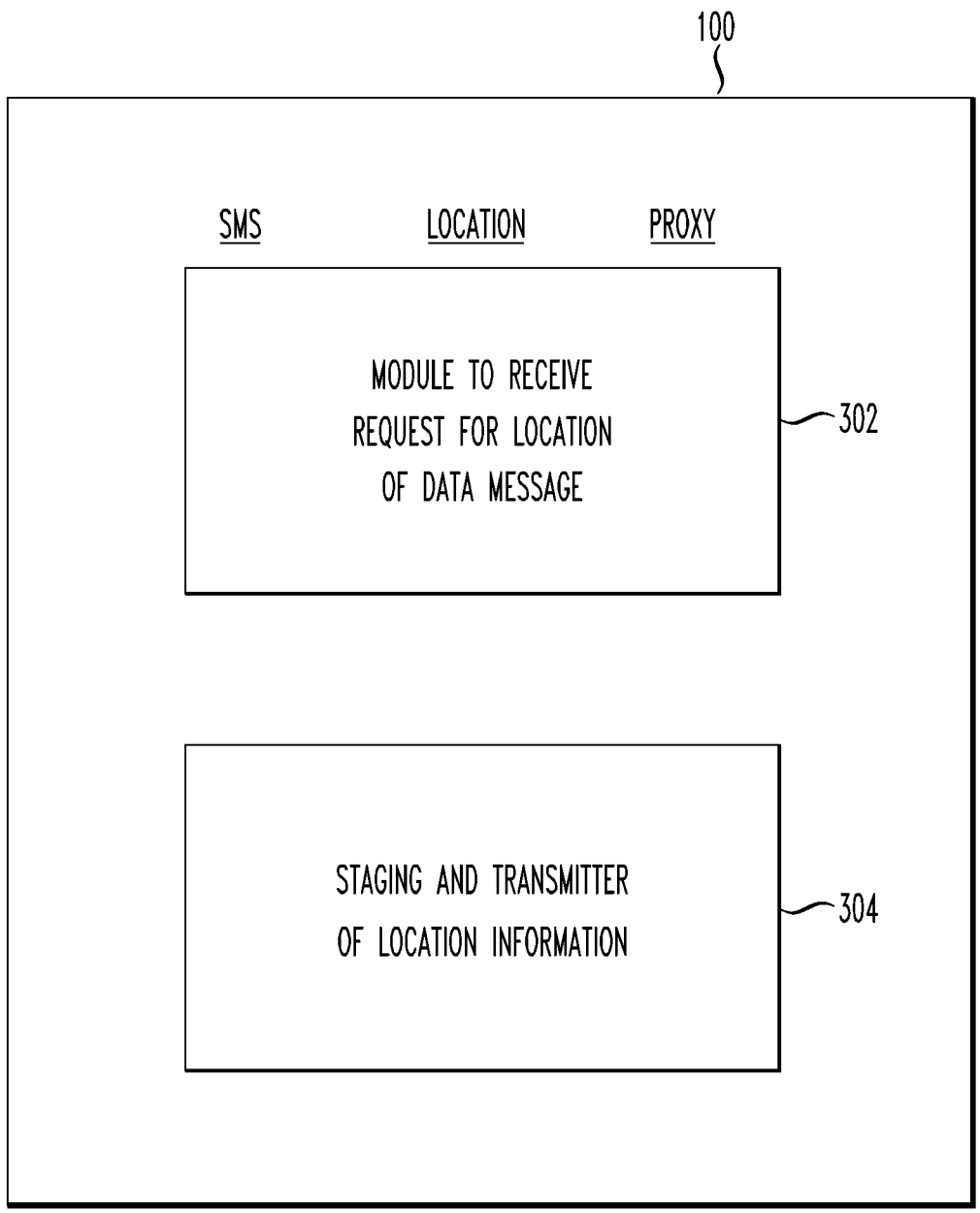
FIG. 2 shows relevant elements of an SMS location proxy in more detail, in accordance with the principles of the present invention.
Figure 3:
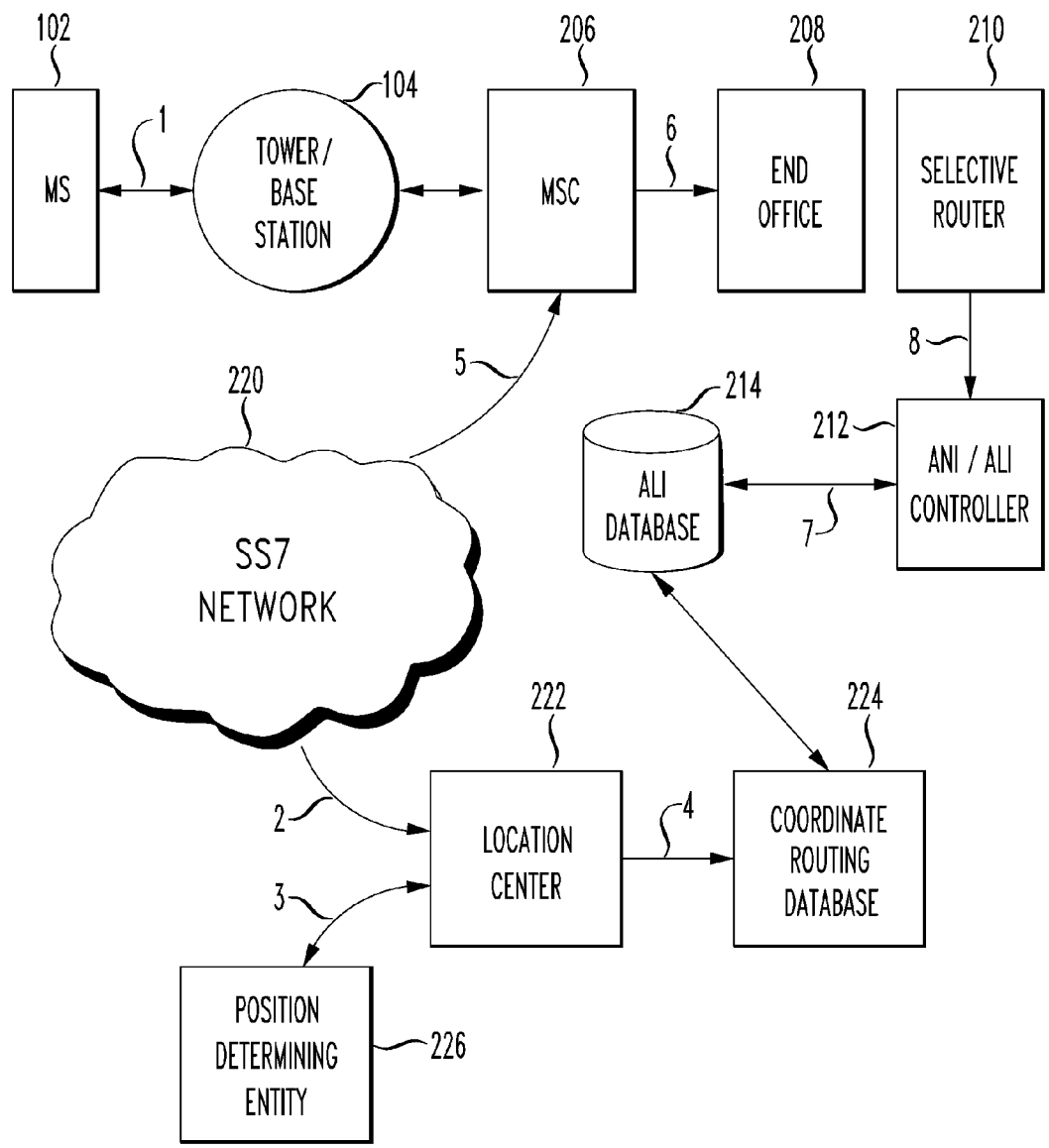
FIG. 3 depicts an overview of conventional enhanced 9-1-1 (E9-1-1) voice call flow in currently deployed architecture.

FIG. 2 shows relevant elements of an SMS location proxy in more detail, in accordance with the principles of the present invention.

In particular, as shown in FIG. 2, the exemplary SMS location proxy 100 includes an application module loaded into an appropriate gateway element to receive requests for location of a data message. The exemplary SMS location proxy 100 also includes an application module that stages the relevant location information relating to the location of emergency data messages (e.g., emergency 911 text messages) and transmits that location information (e.g., lat/long information and/or street address information) to an appropriate emergency services provider such as a PSAP or call center 116 (FIG. 1).

While initially envisioned as a method for supporting SMS initiated emergency 911 text messages, the present invention can also be used for delivery of other types of non-voice initiated sources using non-persistent communications, such as in-vehicle monitoring systems, autonomous monitoring devices for dams/levies, health monitoring equipment, electronic mail, etc. However, in the given example the emergency texting device must be CDMA capable.

This invention enables PSAPs to receive, process, and act upon a wide variety of non-voice messaging information such as a simple text message to complex image messaging (e.g., MMS).

The present invention can be extended for use to enable automated systems to provide text message warnings or notifications to operator monitored services that have a specific geographic regional coverage.

The invention has particular applicability to the wireless E9-1-1 market, including to any US CDMA carrier, and to virtually any company which markets devices with CDMA connectivity.

The present invention permits a method for routing an emergency SMS data message based upon the general or precise location of an emergency texting sender's data messaging device.

While the invention has been described with reference to the exemplary embodiments thereof, those skilled in the art will be able to make various modifications to the described embodiments of the invention without departing from the true spirit and scope of the invention.

What is claimed is:

1. An emergency system short messaging system (SMS) location proxy, comprising:
   an interface between said SMS location proxy and a short messaging service center (SMSC);
   an interface to an emergency service provider;
   a module to provide location information associated with an emergency data message device initiating an emergency data message routed via said SMSC and directed toward said emergency service provider;
   a module to stage, at said SMS location proxy, said location information associated with said emergency data message device; and
   a transmitter, at said SMS location proxy, to transmit said proxy staged location information to said emergency service provider.

2. The emergency system short messaging system (SMS) location proxy according to claim 1, wherein:
   said emergency service provider is a PSAP.

3. The emergency system short messaging system (SMS) location proxy according to claim 1, wherein:
   said emergency service provider is a call center.

4. The emergency system short messaging system (SMS) location proxy according to claim 1, wherein:
   said module to stage said location information stages said location information for retrieval by said emergency service provider.

5. The emergency system short messaging system (SMS) location proxy according to claim 1, wherein:
   said emergency data message is a text message.

6. The emergency system short messaging system (SMS) location proxy according to claim 1, wherein:
   said emergency data message is an email.

7. The emergency system short messaging system (SMS) location proxy according to claim 1, wherein:
   said emergency data message is a multimedia message system message (MMS).

8. Apparatus for providing 911 equivalent data emergency service, comprising:
   a short messaging system (SMS) location proxy to stage location information associated with an emergency data message device initiating an emergency data message;
   a module to request location information associated with said emergency data message device; and
   a transmitter to transmit said staged location information associated with said emergency data message device, from said SMS location proxy to an emergency service provider.

9. The apparatus for providing 911 equivalent data emergency service according to claim 8, wherein:
   said staged location information is provided in response to a request for location received from an emergency service provider.

10. The apparatus for providing 911 equivalent data emergency service according to claim 8, wherein:
    said emergency data message is a text message.

11. The apparatus for providing 911 equivalent data emergency service according to claim 8, wherein:
    said emergency data message is a multimedia message system message (MMS).

12. The apparatus for providing 911 equivalent data emergency service according to claim 8, wherein:
    said emergency data message is an email.

13. A method of providing 911 equivalent data emergency service, comprising:
    receiving, at a data messaging proxy, an emergency data message from an emergency data messaging device;
    transmitting, at said data messaging proxy, a routing information request to a positioning center;
    receiving, at said data messaging proxy, routing information data providing routing information for routing said emergency data message to an emergency message processing device;
    routing, from said data messaging proxy, said emergency data message to said emergency message processing device;
    staging, at said data messaging proxy, location information associated with said emergency data message device; and
    transmitting, at said data messaging proxy, said staged location information to said emergency message processing device.

14. The method of providing 911 equivalent data emergency service according to claim 13, wherein:
    said positioning center is a mobile positioning center.

15. The method of providing 911 equivalent data emergency service according to claim 13, wherein:
    said emergency message processing device is located at a public service access point (PSAP).

16. The method of providing 911 equivalent data emergency service according to claim 13, wherein:
    said emergency message processing device is located at a call center.

17. The method of providing 911 equivalent data emergency service according to claim 13, wherein:
    said emergency data message is a text message.

18. The method of providing 911 equivalent data emergency service according to claim 13, wherein:
    said emergency data message is an email.

19. The method of providing 911 equivalent data emergency service according to claim 13, wherein:
    said emergency data message is a multimedia message system message (MMS).

20. The method of providing 911 equivalent data emergency service according to claim 13, wherein:
    said emergency data message is a short message service (SMS) message.

21. The method of providing 911 equivalent data emergency service according to claim 13, wherein:
    said emergency data message is a signaling system No. 7 (SS7) based data message.

* * * * *